US005560438A

United States Patent [19]

Collee et al.

[11] Patent Number: 5,560,438
[45] Date of Patent: Oct. 1, 1996

[54] METHOD AND COMPOSITION FOR PRESERVING CORE SAMPLE INTEGRITY USING AN ENCAPSULATING MATERIAL

[75] Inventors: Pierre E. Collee, Kingwood; Dorothy P. Enright, Houston, both of Tex.

[73] Assignee: Baker Hughes Incorporated, Houston, Tex.

[21] Appl. No.: 214,392

[22] Filed: Mar. 16, 1994

Related U.S. Application Data

[63] Continuation-in-part of Ser. No. 51,093, Apr. 21, 1993, Pat. No. 5,360,074.

[51] Int. Cl.$^6$ .................................................. E21B 25/08
[52] U.S. Cl. ........................................ 175/58; 175/226
[58] Field of Search ........................ 175/20, 40, 58, 175/59, 60, 226, 233, 249

[56] References Cited

U.S. PATENT DOCUMENTS

| | | |
|---|---|---|
| 2,514,585 | 6/1945 | Natland . |
| 2,537,605 | 8/1947 | Sewell . |
| 2,880,969 | 6/1955 | Williams .................................. 175/226 |
| 3,064,742 | 9/1958 | Bridwell .................................. 175/226 |
| 3,086,602 | 7/1960 | Henderson .............................. 175/404 |
| 3,112,799 | 12/1963 | Gallus ...................................... 175/58 |
| 3,123,158 | 3/1964 | Gallus .................................. 175/226 X |
| 3,207,240 | 9/1965 | Hugel .................................. 175/226 X |
| 3,467,208 | 9/1969 | Kelly ........................................ 175/72 |
| 3,521,715 | 7/1970 | Krutein ................................ 175/226 X |
| 3,548,958 | 12/1970 | Blackwell et al. .................... 175/233 X |
| 3,841,419 | 10/1974 | Russell .................................... 175/40 |
| 4,098,361 | 7/1978 | Lamothe ................................ 175/60 X |
| 4,256,192 | 3/1981 | Aumann .................................. 175/233 |
| 4,272,987 | 6/1981 | Aumann et al. .......................... 73/153 |
| 4,312,414 | 1/1982 | Park ........................................ 175/59 |
| 4,321,968 | 3/1982 | Clear ...................................... 166/275 |
| 4,449,594 | 5/1984 | Sparks .................................. 175/226 X |
| 4,479,557 | 10/1984 | Park et al. ................................ 175/59 |
| 4,598,777 | 7/1986 | Park et al. ................................ 175/58 |
| 4,716,974 | 1/1988 | Radford et al. .......................... 175/59 |
| 4,848,487 | 7/1989 | Anderson et al. ...................... 175/58 |
| 5,360,074 | 11/1994 | Collee et al. ............................ 175/58 |

FOREIGN PATENT DOCUMENTS

| | | |
|---|---|---|
| 0403437 | 6/1990 | European Pat. Off. . |
| 22152109 | 7/1985 | United Kingdom . |

OTHER PUBLICATIONS

Morrison, Robert Thornton et al., *Organic Chemistry*, Sixth Edition, Prentice Hall, 1992, pp. 356, 357.

*Primary Examiner*—George A. Suchfield
*Attorney, Agent, or Firm*—Rosenblatt & Redano P.C.

[57] ABSTRACT

The present invention provides a method for maximizing the chemical integrity and, if desired, maintaining the mechanical integrity of a core sample during transport from a subterranean formation to the surface. The method involves cutting and encapsulating the core sample as it enters the core barrel with an encapsulating material that either (a) inherently is capable of protecting the chemical integrity of the core sample, or (b) is capable of increasing in viscosity and/or solidifying in response to natural decreases in temperature to maintain the mechanical integrity and maximize the chemical integrity of the core sample during transport.

13 Claims, 1 Drawing Sheet

METHOD AND COMPOSITION FOR PRESERVING CORE SAMPLE INTEGRITY USING AN ENCAPSULATING MATERIAL

CROSS-REFERENCES TO RELATED APPLICATIONS

This application is a continuation-in-part of application Ser. No. 08/051,093, filed on Apr. 21, 1993, now U.S. Pat. No. 5,360,074.

FIELD OF THE INVENTION

The present invention relates to a technique for maintaining the mechanical integrity and maximizing the chemical integrity of a downhole core sample which must be brought to the surface in order to analyze a subsurface formation.

BACKGROUND OF THE INVENTION

In order to analyze the amount of oil contained in a particular soil at a particular depth in a subterranean well, a core or core sample of the well formation typically is extracted and brought to the surface for analysis. If the core sample has retained its mechanical and chemical integrity during the trip from downhole to the surface, then an analysis of the core sample will yield accurate data about the percent of fluid and/or gas contained in the formation. The resulting data then may be used to determine the type(s) of fluid—especially oil—that is contained in the formation.

Unfortunately, it is difficult to maintain the mechanical and/or chemical integrity of the core sample during its Journey from downhole to the surface. Downhole, the oil and/or water in the formation may contain dissolved gas which is maintained in solution by the extreme pressure exerted on the fluids when they are in the formation. However, unless a pressure core barrel is used, the pressure on the core when the core is downhole will differ dramatically from the pressure experienced on the core sample as the core sample is brought to the surface.

As the pressure on the core sample decreases during the trip to the surface, the fluids in the core tend to expand, and any gas dissolved in the oil or water contained in the sample will tend to come out of solution. In addition, any "mobile oil," or oil that passes through the core in a manner dependent on the permeability, porosity, and/or volume of fluid contained therein, may drain or bleed out of the core and be lost. If protective measures are not taken, then this sellable gas, mobile oil, and/or some water may be lost during transport of the core to the surface. As a result, the core sample will not accurately represent the composition of the downhole formation.

One means for dealing with the foregoing problem is pressure coring, or transporting the core to the surface while maintaining the downhole pressure on the core. Pressure coring helps to maintain both the mechanical and chemical integrity of the core. However, pressure coring is expensive for a number of reasons, including: the manpower required; the many difficulties that must be overcome to effectively handle the pressurized core; and, the expensive procedures required to analyze the pressurized core once it reaches the surface.

Another technique that has been used in an attempt to maintain core integrity is known as sponge coring. In sponge coring, an absorbent sponge or foam material is disposed about the core so that fluids forced out of the core during depressurization are absorbed by the adjacent sponge layer. However, sponge coring has a number of disadvantages.

Sponge coring typically does not provide accurate data regarding the structure of the formation because of inadequate saturation, and because the wettability of the sponge varies with variations in temperature and pressure. Also, the sponge does not protect the core from the drastic changes in pressure experienced during transport of the core to the surface. Thus, the core geometry or mechanical integrity of the core sample may not be preserved during sponge coring. Also, even though the sponge may absorb some of the gas and/or oil that escapes from the core sample, some of that gas and/or oil also may be lost during transport. Finally, in order for the sponge sleeve to protect the core, the sponge sleeve must be in close contact with the core. Close contact is difficult to achieve in broken or unconsolidated cores. And, because of the high friction coefficient of the sponge close contact between the sponge and the core can result in jamming within the coring tool even where the core is hard and consolidated.

Some improvement in sponge coring has been achieved by at least partially saturating the sponge with a pressurized fluid that (1) prevents drilling mud from caking on the sides of the core, and (2) prevents fluid loss from the core. The pressurized fluid is displaced from the sponge as the core enters the core barrel and compresses the sponge lining. However, "perfect saturation" of the sponge is impossible as a practical matter. Thus, air tends to remain trapped in the sponge and skew the final analysis of the formation. Even if the sponge is presaturated, gas and solution gas expelled from the core sample tends to be lost. Therefore, the sponge does not accurately delineate the gas held in the formation. For these and other reasons, sponge coring, even with presaturation, leaves much to be desired.

Other techniques for maintaining core integrity involve changing the composition of the drilling mud that is used so that the drilling mud does not contaminate the core, resulting in an erroneous analysis of core content. In one such technique, a polymer containing two or more recurring units of two different polymers is incorporated in the drilling fluid in order to minimize variation in rheological properties at ambient versus high downhole temperatures. Another technique for changing the composition of the drilling mud is to mix an oil based fluid with an organophilic clay gelation agent to regulate the thixotropic qualities of the drilling mud or packer fluid. In some of such techniques, the drilling mud actually surrounds and gels to form a capsule around the core sample.

The disadvantage of the foregoing method of "encapsulating" the core sample using drilling mud in situ is that contact between the core sample and the drilling mud or coring fluid is one of the more common factors leading to contamination and unreliability of the core sample. Therefore, it is desirable to minimize contact between the drilling mud and the core sample.

Still others have used thermoplastics and thermosetting synthetics to encapsulate the core sample inside of the core barrel before transporting the sample to the surface. The disadvantage of these techniques is that thermoplastics and thermosetting synthetics require a chemical reaction to harden or viscosify. Furthermore, thermoplastic or thermosetting synthetics harden or "viscosify" in response to an increase in temperature, and will not respond to the natural decrease in temperature to which the core sample will be exposed as it is transported to the surface.

Furthermore, many factors downhole are capable of influencing or even interfering with the chemical reaction required to "harden" a thermoplastic or thermosetting resin. For example, the chemical reaction required for encapsulation in some of these references is, itself, exothermic. The exothermicity of the chemical reaction may affect the timing of the encapsulation and the mechanical and/or chemical integrity of the resulting core sample. Similarly, oil contained in the reservoir may contain gas which comes out of solution before the chemical reaction is complete. The fact that an exothermic chemical reaction may be occurring in the thermoplastic or thermosetting resin at the same time that such gas may be liberated renders the sampling procedure unsafe. For example, the gas may explode upon exposure to any such sudden increase in temperature.

Other techniques for maintaining core integrity involve attempts to remove contaminants from the core before it is depressurized. One such technique is to flush the core before depressurization and to lubricate and/or wash the core as it enters the core barrel. Such techniques may help to maintain core "integrity" after flushing; however, flushing alters the original content of the core and therefore is inherently unreliable.

Some have attempted to develop compositions which will envelope the core and prevent any change in core composition until the envelope is removed. In one such technique, an aqueous gel, such as carboxymethylhydroxyethylcellulose (CMHEC), has been mixed with an aqueous brine solution and an alkaline earth metal hydroxide, such as calcium hydroxide, to form a gel which serves as a water diversion agent, a pusher fluid, a fracturing fluid, a drilling mud, or a workover or completion fluid. In another such technique, material with colliative properties, particularly a carbohydrate such as sucrose or starch, and optionally a salt, such as potassium chloride, has been added to the drilling mud to mitigate the osmotic loss of the aqueous phase of the drilling mud. Still others have tried pumping an oleophilic colloid through the drill string so that the colloid contacts and is dispersed in an oleaginous liquid forming gel which tends to plug the formation.

Unfortunately, none of these techniques has been completely successful in maintaining the mechanical and chemical integrity of a core sample during transport from downhole to the surface. Also, many of these techniques either are expensive or difficult, and may be dangerous to perform. A safe, economical, and efficient technique is needed by which the integrity of the core sample can be maintained while it is transported from downhole to the surface.

SUMMARY OF THE INVENTION

The present invention provides a method for maximizing the chemical integrity and, if desired, maintaining the mechanical integrity of a core sample during transport from a subterranean formation to the surface. The method involves cutting and encapsulating the core sample as it enters the core barrel with an encapsulating material that either (a) inherently is capable of protecting the chemical integrity of the core sample, or (b) is capable of increasing in viscosity and/or solidifying in response to natural decreases in temperature to maintain the mechanical integrity and maximize the chemical integrity of the core sample during transport. The specific formulation of the encapsulating material differs depending upon the expected downhole conditions. Preferred encapsulating materials comprise polyalkylene derivatives, such as polyethylene, which may be used with formations even at relatively high temperatures of 250° F. or higher, or ethylene vinyl acetate copolymer, which preferably is used with formations at relatively lower temperatures. Another preferred encapsulating material comprises a polyglycol, preferably polyethylene glycol or polypropylene glycol. The encapsulating material also can include one or more of: (a) a particulate sealing agent capable of sealing the pores of the core sample to prevent the loss and/or invasion of water or other gaseous or fluid components; (b) a thickener; (c) a compound capable of decreasing the water solubility, if any, of the particular encapsulating material chosen; and (d) a nucleating agent. The integrity of the core sample can be even further maximized by using a pressure core barrel to transport the encapsulated core sample to the surface.

DETAILED DESCRIPTION OF A PREFERRED EMBODIMENT

Figure 1:
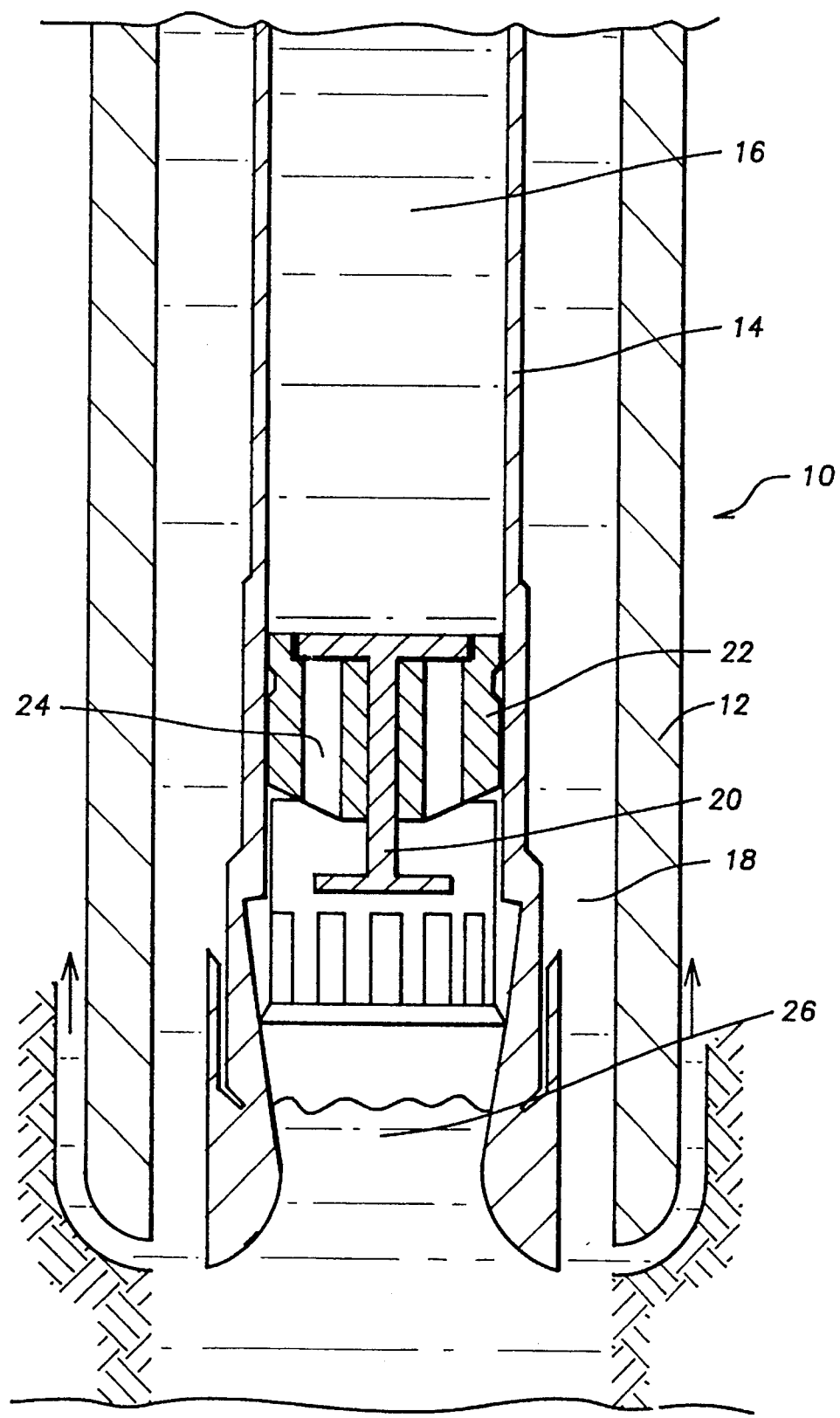
FIG. 1 is a cross sectional view of a segment of a drill bit suitable for use in conjunction with the present invention before encapsulation of the core.

The encapsulating materials of the present invention either (a) are inherently capable of protecting the chemical integrity of the core sample, or (b) are capable of increasing in viscosity and/or solidifying in response to decreases in temperature to protect the mechanical and chemical integrity of the core sample during transport to the surface.

A preferred encapsulating material may comprise a polyalkylene derivative, such as polyethylene, which is capable of use with formations at relatively high temperatures of 250° F. or higher, or a derivative such as ethylene vinyl acetate copolymer, which would preferably be used with formations having relatively lower temperatures.

Another preferred encapsulating material for use in the present invention comprises at least one member of the oxyalkylene polymer family, preferably a polyglycol, such as polyethylene glycol or polypropylene glycol. Preferred encapsulating materials contain polyethylene glycol, a mixture of polyethylene glycol and polyethylene, a mixture of polyethylene glycol and ethylene vinyl acetate, and polypropylene glycol.

The encapsulating material of the present invention will vary in composition depending upon the characteristics of the formation to be sampled. For example, a highly permeable formation will require a highly viscous encapsulating material that will not invade the core sample. In contrast, a core sample from a tighter formation having very little permeability could be protected using an encapsulating material that is not as highly viscous because the tendency of the encapsulating material to invade the core sample will be reduced.

Some polyglycols, such as polypropylene glycol, are highly viscous both at relatively high temperatures and at room temperature. Such naturally viscous polyglycols are capable of at least protecting the chemical integrity of a core sample without substantial "viscosification." However, normally viscous polyglycols do not hold the core sample together as firmly as polyglycols which actually harden during transport and may not be capable of maintaining the mechanical integrity of the core sample as well as such polyglycols. Therefore, naturally viscous polyglycols, such as polypropylene glycol, are preferred for use in sampling formations where preservation of the mechanical integrity of the core sample is not as crucial. For example, polypropylene glycol might be appropriate to protect the chemical integrity of a core sample from a formation which is loosely held, cracked, or otherwise not highly consolidated.

A preferred formulation for a polyethylene glycol based encapsulating material contains a combination of two polyethylene glycols. Suitable polyglycols may be obtained from many suppliers. The following polyethylene glycols are sold under the name "CARBOWAX" by Union Carbide. In a preferred embodiment, one polyethylene glycol is a hard, waxy, white solid in powder or flake form which has a melting or freezing range of 60°–63° C. (140°–145.4° F.), is about 63% water soluble at 20° C. (68° F.), has a viscosity of about 822 centistokes at 98.89° C. (210° F.), and has an average molecular weight of about 8000 ("8M," e.g., "CARBOWAX" Polyethylene Glycol 8000). The other polyethylene glycol is a hard, waxy, white solid in powder or flake form which has a melting or freezing range of 61°–64° C. (141.8°–147.2° F.), is approximately 65% water soluble at 20° C. (68° F.), has a viscosity of 18,650 centistokes at 98.89° C. (210° F.), and has an average molecular weight of about 20,000 ("20M," e.g., "CARBOWAX" Polyethylene Glycol 20,000). The ratio of the 8M:20M polyethylene glycols, respectively, may vary widely depending upon the characteristics of the formation, with a preferable range being between about 1:1 and 1:10, more preferably between about 1:1–1:3. For example, if the formation is very fragile, then a lower viscosity will be desired and the ratio of 8M polyethylene glycol should be increased.

A preferred encapsulating material for use in the present invention is a polyethylene glycol having the following structure:

wherein R is selected from the group of a hydrogen or a methyl group. The value "n" represents the number of repeating polyethylene oxide units in the polymer, and can range between about 20–181, depending upon the preferred molecular weight of the encapsulating material.

The preferred molecular weight of the encapsulating material should be determined based on the permeability of the formation. The likelihood that the polyethylene glycol will permeate the core sample decreases as the molecular weight of the polyethylene glycol increases. Thus, depending upon the value of "n," the molecular weight of the polyethylene glycols useful in the present invention may vary between about 400–20,000 units.

Polypropylene glycols having a molecular weight over about 1000, more preferably between about 1200–4000, also are preferred for use in the present invention. Polypropylenes having a molecular weight over 4000 also may be used with appropriate downward adjustments in the amount of filtration control agents.

Filtration control agents that may be desirable additives include natural or synthetic thickeners and/or particulate sealing agents. Suitable thickeners include calcium carbonates, lignites, such as oxidized leonardite, fumed silica, and similar materials. A desirable amount of thickener would be an amount between about 1–10% by weight, preferably between about 1–5% by weight. A particulate sealing agent should be capable of sealing the pores of the core sample and preventing water and other gases or fluids from invading or escaping from the core sample. This sealing agent could be a thickening agent, itself, or a separate powder, such as calcium carbonate. If a separate powder is used, such as calcium carbonate, then that powder should be present at between about 10–60% by weight, and more preferably between about 30–40% by weight.

Depending upon the permeability of the formation, it may be desirable to use both "hard" and "soft" particulates to seal the pores at the outer surface of the core sample. Hard particulates include calcium carbonate and similar powders or graded materials. Softer particulates may be capable of filling gaps left by the hard particulates. Suitable soft particulates include polymeric materials such as Airflex RP245 (a polyvinyl acetate powder) and/or Airflex 426 (a polyvinyl acetate emulsion), which may be obtained from Air Products and Chemicals, Inc.

If the chosen polyalkylene derivative or polyglycol has a relatively low molecular weight, then thickening agents also may be required to prevent the polymer from liquefying at relatively high downhole temperatures. Liquefication of the polymer could lead to unwanted leakage of the encapsulating material from the core barrel. This is particularly true where the encapsulating material is comprised primarily of polyethylene glycol, polyethylene, or other relatively low molecular weight polyglycols or polyalkylene derivatives. A preferred thickening agent for such encapsulating materials is silica, fumed silica, or a silica gel. If the chosen polyglycol or polyalkylene derivative has a relatively high molecular weight, then it may be necessary to reduce the amount of particulates, powders, etc. contained in the encapsulating material in order to decrease the viscosity of the material for ease in handling. In general, the lower the molecular weight of the polyglycol or polyalkylene derivative, the more thickeners, particulates, and/or viscosifying agents will be required to prevent the encapsulating material from liquefying downhole to the extent that it will escape from the core barrel.

Polyethylene glycol is water soluble. Therefore, if the formation to be sampled contains water, and the encapsulating material will be based on polyethylene glycol, then it may be preferable to add a waxy agent, such as polyethylene, to render the encapsulating material less water soluble. However, if the formation to be sampled does not contain water, or contains very little water, it may not be necessary to add such an agent. Polypropylene glycols suitable for use in the encapsulating material, and most polyalkylene derivatives, are not water soluble; therefore, it should not be necessary to add a waxy agent to an encapsulating material based on polyalkylene derivative, a propylene glycol, or another polyglycol that may be water insoluble.

Another desirable supplement or additive, particularly if the encapsulating material will solidify during transport, may be a nucleating agent which would increase the heat transfer properties of the encapsulating material and enhance the rate at which the viscosity or solidity of the material would increase, particularly downhole where the temperature is higher. Preferable nucleating agents include powdered metals, such as copper or aluminum, preferably about 5–10% by volume (about 25–50% by weight), and more preferably about 7–8% by volume (about 35–40% by weight). Such nucleating agents preferably should have very fine particle size, most preferably less than 15 microns. The use of an encapsulating material which contains both a thickener and a powdered metal as additives should create a synergistic effect which will enhance the rate at which the viscosity or solidity of the material increases. A synergistic effect should arise because the particles of the thickener, themselves, would act as a nucleating agent at lower temperatures. In other words, the powdered metal may (1) act as a heat sink or a heat transfer agent, and therefore enhance the rate at which the viscosity or solidity of the material increased downhole at higher temperatures, and (2) act as a nucleating agent or a triggering agent, "triggering" the encapsulating material to begin crystallizing farther downhole than might be expected otherwise.

While the powdered metal is acting as a heat sink/heat transfer agent, the core sample would be moving toward the surface. At some point, the encapsulating material would become cool enough that the thickener particles, themselves, would begin to act as nucleating agents. At that point, the rate at which the encapsulating material increased in viscosity or solidity would become much more rapid. This increase in viscosification/solidification would be due, at least in part, to the fact that the particles of the thickener are very small, and therefore a vast number of particles would be available to act as "triggers" for crystallization. If the encapsulating material actually solidifies, then it should form a friable, waxy solid which may be removed easily once the core sample reaches the surface.

If the formation requires an encapsulating material that will solidify in order to protect the core sample, one of the most important factors influencing the composition of the encapsulating material will be the expected temperatures downhole and during the trip to the surface. The temperatures typically encountered downhole range between about 37.78°–121.11° C. (100°–250° F.). To sample formations which require a highly viscous or even solid encapsulating material to fully protect the core sample, the encapsulating material should be capable of substantially increasing in viscosity and preferably should begin to increase in viscosity or to solidify at temperatures ranging between about 37.78°–65.56° C. (100°–150° F.).

The encapsulating materials of the present invention which do substantially increase in viscosity, or even solidify, do so in response to natural decreases in temperature which the core sample encounters as it is transported to the surface. A chemical reaction is not required in order for the encapsulating materials to viscosify. For reasons already discussed, the fact that a chemical reaction is not required for viscosification or solidification of the encapsulating material of the invention renders the encapsulating materials of the present invention much more reliable and much less dangerous than encapsulating materials such as thermoplastics or thermosetting resins, which must undergo a chemical reaction to "viscosify."

Use of the encapsulating materials of the present invention, alone, without using a pressure core barrel, should maintain substantially complete integrity of the core sample during transport. When compared to other available options that do not use a pressure core barrel, use of the encapsulating material of the present invention at least maximizes the chemical integrity of the core sample. If complete chemical integrity is required, then the present encapsulating material should be used in conjunction with a pressure core barrel. The use of both the encapsulating material and a pressure core barrel will virtually guarantee the chemical integrity of the core sample.

The invention may be used with any suitable drilling assembly. For example, the assembly is shown in U.S. Pat. No. 4,716,974, incorporated herein by reference, would be suitable. A preferred assembly is shown in FIG. 1, a diagrammatic cross-sectional illustration showing a simplified coring tool to be used with the present invention. The embodiment shown in FIG. 1 is in no way intended to limit the invention. Any number of coring tool designs may be used in conjunction with the theories and claims of the invention.

Referring to FIG. 1, coring tool 10 comprises an outer tube 12 concentrically disposed outside and around an inner tube 14 which holds the encapsulating material 16. Typically, the inner tube 14 is coupled within the drill string to a bearing assembly (not shown) so that the inner tube 14 remains rotationally stationary as the outer tube 12 and the bit rotate. Drilling mud flows through the annular space 18 between the outer diameter of the inner tube 14 and the inner diameter of the outer tube 12. Drilling mud continues to flow downward longitudinally within the annular space 18 of the tool 10, as needed.

A piston 20 having at its upper end a rabbit is located at the bottom of the inner tube 14. The rabbit 22 has longitudinal chambers 24 adapted such that, once an appropriate level of pressure is reached, the encapsulating material 16 flows through said longitudinal chambers 24. As the core 26 enters the lower end of the inner tube 14, the core 26 presses upward against the piston 20, and the resulting pressure is translated to the encapsulating material 16. At some point, the pressure becomes sufficient to force the encapsulating material 16 through the longitudinal chambers 24 in the rabbit 22 to surround the core 26. Thus, the core sample is encapsulated by the encapsulating material as it enters the core barrel. This minimizes contact between the core sample and the drilling mud or coring fluid, and thereby enhances the reliability of the sampling procedure.

Once the desired core sample 26 is obtained, the core sample 26 is isolated using conventional means and the encapsulating material 16 is permitted to completely surround the core sample 26. The encapsulated core sample 26 then is transported to the surface using conventional means. As the ascent to the surface begins, the temperature to which the core sample is exposed will begin to decrease. Once the temperature reaches an expected low, 48.80° C. (120° F.), the encapsulating material should begin to viscosify or solidify. The encapsulating material should be completely viscosified or solidified before the pressure within the inner tube 14 has changed sufficiently for the core sample 26 to lose its integrity.

The invention will be more fully understood with reference to the following examples.

EXAMPLE 1

In this first example, a core sample was taken from a formation in the North Sea. The downhole static temperature in the formation was about 85° C. (185° F.) and the downhole circulating temperature was about 71.11° C. (160° F.). The sample removed from the formation was sent to the laboratory and subjected to 1,378,952 Newtons/m$^2$ (200 psi) pressure and to a temperature of about 65.56° C. (150° F.).

An encapsulating material having the following composition was formulated:

23.8% 8M polyethylene glycol ("CARBOWAX" Polyethylene Glycol 8000)

59.5% 20M polyethylene glycol ("CARBOWAX" Polyethylene Glycol 20,000)

5.5% "WO-30"

11.1% "MIL CARB"

Note that the ratio of 8M:20M polyethylene glycol was approximately 2:1.

"CARBOWAX" Polyethylene Glycol 8000 was obtained from Union Carbide Corporation, and is 100% polyoxyethylene glycol having an average molecular weight of about 7000–9000, CAS #25322-68-3. "CARBOWAX" Polyethylene Glycol 20,000 was obtained from Union Carbide Corporation, and is a 100% polyethylene glycol having an average molecular weight of about 15,000–20,000, CAS

37225-26-6. "WO-30" is a calcium carbonate available in course or fine rain form from Baker Hughes Inteq, P.O. Box 22111, Houston, Tex. 77227. "MIL CARB" is a sized calcium carbonate which is also available from Baker Hughes Inteq.

The following were the physical characteristics of the resulting encapsulating material:

| | | |
|---|---|---|
| Decomposition Point | > | 200° C. (392° F.) |
| Melting Point | = | 57.77° C. (135° F.) |
| Specific Gravity | = | 1.075 at 80/20° C. |
| Vapor Pressure @ 20° C. (68° F.) | = | Nil |
| Vapor Density | = | >1 |
| Solubility in Water (% by wt) | = | 50 at 20° C. (68° F.) |
| Appearance and Odor | = | White solid (flake, powder or molten); mild odor. |

The core sample was encapsulated in the foregoing material, and the pressure and temperature on the encapsulated core sample gradually were reduced to ambient. The core sample then was analyzed, and it was determined that the encapsulating material had not invaded the core sample.

Experimental Procedure for Determining Filtrate Loss of Coring Gel, Examples 2–6

The following equipment and procedures were used in Examples 3–7.

Equipment

The equipment included an HTHP Filter Press Heating Jacket for 10 inch cell (500 ml. capacity) complete with back pressure receiver, manifold, thermometers, etc., obtained from OFI Testing Equipment, Houston, Tex. The back pressure receiver was fitted with a calibrated plastic centrifuge tube to measure small filtrate volumes of < about 0.5 ml. The HTHP 10 inch cell was modified to take ¼ inch ceramic disc.

A Berea sandstone disc, 0.5 Darcy permeability, was used for quality assurance testing. Other permeability discs may be used for experimental work.

Test Procedure

1. The Heat Jacket was heated to test temperature (200° F. for quality assurance testing).

2. The sandstone disc was saturated with water for at least 24 hours, free water was blotted off of disc, and the disc was positioned in the bottom of cell.

3. The cap was secured on the bottom of cell; the valve stem was inserted in the cell cap; and, the valve stem was closed.

4. The cell was inverted and 100–150 ml of encapsulating material was added to the cell. (If the encapsulating material was solid at room temperature, then the material was heated to softening to pour into the cell.) The sample of encapsulating material completely covered the disc.

5. The cap was secured on top of cell; the valve stem was inserted into the cap; and, the valve stem was closed.

6. The cell was placed in the heating jacket, making sure that the valve stem in the bottom of the cell was closed.

7. $N_2$ was attached via a manifold to the top of the valve stem, and a desired $N_2$ pressure was applied to the cell. The top valve was opened ¼ turn.

8. The cell temperature was allowed to reach equilibrium with the furnace temperature.

9. The back pressure receiver was attached to the bottom of the valve stem, and a desired $N_2$ pressure was applied to the receiver.

10. The bottom valve stem was opened ¼ turn, and the timing of the filtration rate was begun immediately.

11. After 30 minutes, the bottom valve stem was closed, and the pressure in the receiver was released and removed from the valve stem. The amount of water in the inner tube was recorded. (A notation was made if fluid other than water was present.)

12. The top valve stem was closed, and the $N_2$ released. The cell was disconnected from the manifold and removed from the heating jacket. The cell was cooled to room temperature. The top valve stem was opened to relieve pressure in the cell before opening the cell for cleaning.

Interpreting Test Results

The initial goal of the following experiments was to achieve a "spurt loss" of 0.0 mls at 30 min.; however, at temperatures of 200° F. and up, it was impossible to measure the spurt loss because the water evaporated. Therefore, an alternative measurement of "filtration rate" at ml/30 min in a closed vessel was used. Using a closed vessel, if the filtration rate is 0.0 ml after 30 minutes, the spurt rate assuredly is 0.0 ml.

EXAMPLE 2

In this experiment, the encapsulating material was based on polyethylene glycol, and had the following composition:

| Component | % |
|---|---|
| "CARBOWAX" 20M | 36.5 |
| "CARBOWAX" 8000 | 28.9 |
| "MIL CARB" | 18.2 |
| "WO 30" (F) | 9.1 |
| "WO 30" (C) | 4.6 |
| "LIGCO" | 1.5 |
| "CAB-O-SIL" M-5 | 1.2 |

The following were obtained from Baker Hughes Inteq of Houston, Tex.: "MIL CARB," a graded calcium carbonate; "WO 30" (F) and (C), sized calcium carbonates; and, "LIGCO," an oxidized leonardite. "CAB-O-SIL" M-5 is a fumed silica, which was obtained from Cabot Corporation.

The following results were obtained:

| Filtration Characteristics Under Indicated Conditions | | | |
|---|---|---|---|
| Temp. °F. | Pressure, PSI* | Permeability** | Filtration Rate (ml/30 min.) |
| 200 | 100 | 0.5 darcy | 0.0 |
| 300 | 100 | 0.5 darcy | 0.0 |
| 200 | 200 | 0.5 darcy | 0.0 |
| 200 | 300 | 0.5 darcy | 0.4 |
| 200 | 100 | 0.8 darcy | 1.0(A) |
| 200 | 100 | 0.5 darcy | 0.0 |
| 300 | 100 | 0.5 darcy | 0.0 |
| 325 | 100 | 0.5 darcy | 1.2 |

*"Pressure, PSI" refers to differential pressure as per test method.
**"Permeability" refers to the permeability of the filter medium. Berea Sandstone.
A--Spurt loss of 0.3 ml under these conditions.

EXAMPLE 3

The encapsulating material used in this experiment was based on polyethylene glycol/polyethylene, and had the following composition:

| Component | % |
|---|---|
| "CARBOWAX" 20M | 5.5 |
| "CARBOWAX" 8000 | 5.5 |
| "A-C" Polyethylene 617 | 55.1 |
| "MIL CARB" | 18.4 |
| "WO 30" (F) | 9.2 |
| "AIRFLEX" RP 245 | 3.7 |
| "LIGCO" | 1.8 |
| "CAB-O-SIL" M-5 | 0.7 |

"A-C" Polyethylene 617 is a polyethylene homopolymer, which was obtained from Allied Signal Chemical Co., Morristown, N.J. "AIRFLEX" RP245 is a polyvinyl acetate powder, which was obtained from Air Products and Chemicals, Inc.

The following results were obtained:

| Filtration Characteristics Under Indicated Conditions | | | |
|---|---|---|---|
| Temp °F. | Pressure, PSI | Permeability | Filtration Rate (ml/30 min.) |
| 200 | 100 | 0.5 darcy | 0.0 |

EXAMPLE 4

The encapsulating material used in this experiment was based on a combination of polyethylene glycol/polyethylene, and had the following composition:

| Component | % |
|---|---|
| "CARBOWAX" 20M | 5.4 |
| "CARBOWAX" 8000 | 5.4 |
| "A-C" Polyethylene 617 | 54.2 |
| "MIL CARB" | 19.8 |
| "WO 30" (F) | 10.8 |
| "WO 30" (C) | 1.8 |
| "LIGCO" | 1.8 |
| "CAB-O-SIL" M-5 | 0.7 |

The following results were obtained:

| Filtration Characteristics Under Indicated Conditions | | | |
|---|---|---|---|
| Temp. °F. | Pressure, PSI | Permeability | Filtration Rate (ml/30 min.) |
| 250 | 100 | 0.5 darcy | 0.6 |

EXAMPLE 5

The encapsulating material used in this experiment was based on a combination of polyethylene glycol/ethylene vinyl acetate copolymer, and had the following composition:

| Component | % |
|---|---|
| "CARBOWAX" 20M | 5.7 |
| "CARBOWAX" 8000 | 5.7 |
| "A-C" Copolymer 430 | 56.6 |
| "MIL CARB" | 23.6 |
| "WO 30" (F) | 4.7 |
| "LIGCO" | 2.3 |
| "CAB-O-SIL" M-5 | 1.4 |

"A-C" Copolymer 430 is an ethylene vinyl acetate copolymer, which was obtained from Allied Signal Chemical Co., Morristown, N.J.

The following results were obtained:

| Filtration Characteristics Under Indicated Conditions | | | |
|---|---|---|---|
| Temp. °F. | Pressure, PSI | Permeability | Filtration Rate (ml/30 min.) |
| 200 | 100 | 0.5 darcy | 0.0 |

EXAMPLE 6

The encapsulating material used in this experiment was based on polypropylene glycol, and had the following composition:

| Component | % |
|---|---|
| "PPG-4000" | 48.6 |
| "AIRFLEX" 426 | 21.1 |
| "CAB-O-SIL" M-5 | 1.1 |
| "MIL CARB" | 24.6 |
| "LIGCO" | 4.6 |

"PPG-4000" is polypropylene glycol having an average molecular weight of about 4000, obtained from Dow Chemical Co. "AIRFLEX" 426 is a polyvinyl acetate emulsion, obtained from Air Products and Chemicals, Inc.

The following results were obtained:

| Filtration Characteristics Under Indicated Conditions | | | |
|---|---|---|---|
| Temp. °F. | Pressure, PSI | Permeability | Filtration Rate (ml/30 min.) |
| 200 | 100 | 0.5 darcy | 0.0 |
| 200 | 100 | 0.8 darcy | 0.175 (A)(B) |
| 200 | 200 | 0.5 darcy | 0.60 (B) |
| 175 | 100 | 0.5 darcy | 0.0 |
| 200 | 100 | 2.5 darcy | 0.0 |
| 200 | 250 | 0.8 darcy | 0.0 |
| 200 | 500 | 0.8 darcy | 0.0 |

A - Zero spurt loss.
B - No back pressure in receiving vessel as per test method.

One of skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A method for maximizing the chemical integrity and maintaining the mechanical integrity of a core sample during transport from a subterranean formation to the surface comprising:

cutting a core sample downhole, said core sample having an outer surface;

encapsulating said core sample, as said core sample enters said core barrel, with an encapsulating material comprising a polyethylene glycol and polyethylene, said encapsulating material being capable of increasing in viscosity in response to a decrease in temperature during transport to a level and at a time sufficient to protect said integrity of said core sample during transport; and transporting said encapsulated core sample to said surface.

2. A method for maximizing the chemical integrity of a core sample during transport from a subterranean formation to the surface comprising:

cutting a core sample downhole, said core sample having an outer surface;

encapsulating said core sample, as said core sample enters said core barrel, with an encapsulating material comprising polypropylene glycol; and transporting said encapsulated core sample to said surface.

3. The method of claim 2 wherein said polypropylene glycol has a molecular weight greater than about 1000.

4. The method of claim 2 wherein said encapsulating material further comprises a particulate sealing agent capable of substantially sealing the pores present at said outer surface of said core sample.

5. The method of claim 2 wherein said core sample is transported to said surface in a pressure core barrel.

6. The method of claim 3 wherein said core sample is transported to said surface in a pressure core barrel.

7. The method of claim 4 wherein said core sample is transported to said surface in a pressure core barrel.

8. A method for maintaining the mechanical integrity and maximizing the chemical integrity of a core sample during transport from a subterranean formation to the surface comprising:

cutting a core sample downhole, said core sample having an outer surface;

encapsulating said core sample, as said core sample enters said core barrel, with an encapsulating material comprising a polyalkylene derivative capable of increasing in viscosity in response to a decrease in temperature during transport to a level and at a time sufficient to protect said integrity of said core sample during transport; and transporting said encapsulated core sample to said surface.

9. The method of claim 8 wherein said polyalkylene derivative is polyethylene.

10. The method of claim 8 wherein said polyalkylene derivative is ethylene vinyl acetate copolymer.

11. The method of claim 8 wherein said encapsulating material further comprises a particulate sealing agent capable of substantially sealing the pores present at said outer surface of said core sample.

12. The method of claim 8 wherein said core sample is transported to said surface in a pressure core barrel.

13. A method for maintaining the mechanical integrity and maximizing the chemical integrity of a core sample during transport from a subterranean formation to the surface comprising:

cutting a core sample downhole using a coring tool, said core sample having an outer surface;

encapsulating said core sample, as said core sample enters an inner tube in said coring tool, with an encapsulating material capable of protecting the integrity of said core sample during transport; and transporting said encapsulated core sample to said surface in a pressure core barrel.

* * * * *